United States Patent [19]

Hermans et al.

[11] Patent Number: 5,307,278
[45] Date of Patent: Apr. 26, 1994

[54] METHOD OF DETERMINING THE POSITION OF A VEHICLE, ARRANGEMENT FOR DETERMINING THE POSITION OF A VEHICLE, AS WELL AS A VEHICLE PROVIDED WITH SUCH AN ARRANGEMENT

[75] Inventors: Hans G. M. Hermans, Eindhoven; Willem Van Der Gugten, Amsterdam, both of Netherlands

[73] Assignee: U.S. Philips Corporation, New York, N.Y.

[21] Appl. No.: 742,787

[22] Filed: Aug. 8, 1991

[30] Foreign Application Priority Data

Aug. 13, 1990 [NL] Netherlands .................. 9001810

[51] Int. Cl.⁵ .................. G06F 15/50; G08G 1/123
[52] U.S. Cl. .................. 364/450; 364/443; 364/449; 340/991; 340/993
[58] Field of Search .................. 364/449, 450, 443, 444; 340/988, 990; 73/178 R

[56] References Cited

U.S. PATENT DOCUMENTS

| | | | |
|---|---|---|---|
| 4,727,492 | 2/1988 | Reeve et al. | 364/424 |
| 4,791,574 | 12/1988 | Thoone et al. | 364/450 |
| 4,796,191 | 1/1989 | Honey et al. | 364/450 |
| 4,847,773 | 7/1989 | van Helsdingen et al. | 364/443 |
| 4,962,458 | 10/1990 | Verstraete | 364/443 |
| 4,970,652 | 11/1990 | Nagashima | 364/449 |
| 5,046,011 | 9/1991 | Kakihara et al. | 364/450 |
| 5,058,023 | 10/1991 | Kozikaro | 364/450 |
| 5,115,398 | 5/1992 | De Jong | 364/443 |
| 5,119,301 | 7/1992 | Shimizu et al. | 364/449 |
| 5,170,353 | 12/1992 | Verstraete | 364/444 |

OTHER PUBLICATIONS

Harris et al, "Digital Map Dependent Functions Automatic Vehicle Location Systems", Department of Surveying Engineering, The University of Calgary, Calgary Canada T2N 1N4, pp. 79-87, Nov. 1988.

Thoone, "Carin, a car information and navigation system", Philips Technical Review, vol. 43, No. 11/12, Dec. 1987, pp. 317-329.

Course on Radiopositioning, Depart of Geodesy, Jan. 14-17, 1985, Entire Course Book.

Primary Examiner—Thomas G. Black
Assistant Examiner—Tan Q. Nguyen
Attorney, Agent, or Firm—Robert J. Kraus

[57] ABSTRACT

For the determination of the position of a vehicle, navigation parameters are measured, with which periodically dead reckoning coordinates are calculated, which are compared to topographical and traffic technical information stored in a global data base. A local navigation data base is being kept and updated, containing relevant sub-information from the global data base. Using the dead reckoning coordinates test steps are performed on route segments from the local navigation data base, on the basis of which route segments forming possibly driven routes, are stored in a data structure and pseudo-segments are derived from consecutively calculated dead reckoning coordinates which form a pseudo-route and are stored in a further data structure. By comparing the route segments in the data structure and the pseudo-segments in the further data structure a well-founded correction vector for the dead reckoning coordinates is periodically determined.

16 Claims, 10 Drawing Sheets

ELLIPSE (VLPA) 1

ELLIPSE (VLPA) 2

ELLIPSE (VLPA) 3

ELLIPSE (VLPA) 4

ELLIPSE (VLPA) 5A

ELLIPSE (VLPA) 6

ELLIPSE (VLPA) 7

METHOD OF DETERMINING THE POSITION OF A VEHICLE, ARRANGEMENT FOR DETERMINING THE POSITION OF A VEHICLE, AS WELL AS A VEHICLE PROVIDED WITH SUCH AN ARRANGEMENT

BACKGROUND OF THE INVENTION

Electronic navigation and information systems are being developed for use in motor cars. These systems can relieve the driver of a car or his passengers from the task of finding the best route to a destination. More specifically for the police, fire brigade, ambulances and suchlike it is of great importance that they do not lose time in looking for the best route, but also for the average car driver such a system may save much annoyance. Not only can the system be useful in unknown regions, but also in familiar surroundings, as it can map out a route which avoids traffic jams.

Such a system must known the actual position of a vehicle to be navigated.

The invention relates to a method of determining the position of a vehicle, in which navigation parameters are measured with which periodically dead reckoning coordinates are calculated, which are compared to topographical and traffic-technical information stored in a global data base, an arrangement for the determination of the position of a vehicle, provided with a memory for storing a global data base with topographical and traffic-technical information and a processor which is programmed for periodically calculating dead reckoning coordinates on the basis of measured navigation parameters, as well as to a vehicle provided with such an arrangement. Such a method and arrangement are known from the article "CARIN, a car information and navigation system" by M. L. G. Thoone, Philips Technical Review, Vol. 43, No. 11/12, December 1987.

SUMMARY OF THE INVENTION

It is inter alia an object of the invention to provide a more efficient method and arrangement which enable a more accurate positional fix. To that end, a method according to the invention is characterized, in that, a local navigation data base LND is being kept and updated with relevant sub-information from the global data base, whereby, using the dead reckoning coordinates, test steps are performed on route segments from the local navigation data base, on the basis of which route segments which form possibly driven routes, are stored in a data structure PSD. By utilizing a local navigation data base which is regularly adapted to the actual position, the data from the data base required for the tests are always readily available. This is important as the bulk of the global data base is very large and consequently the access time to the data is not so short as to be neglectable. Storing the route segments, which were selected from the local navigation-data base by means of the test steps is an auxiliary means for an accurate position fix. Thus, when the vehicle changes direction, the correct route segment can be recognized from the stored route segments.

In accordance with a further embodiment, a method according to the invention, is characterized, in that, pseudo-segments which form a pseudo-route and are stored in a further data structure DRD are derived from consecutively calculated dead reckoning coordinates. The derived pseudo-segments form the history of the dead reckoning coordinates (therefore alternatively denoted Dead Reckoning History). Storing these pseudo-segments is also an auxiliary means for an accurate positional fix. Thus a striking point in the Dead Reckoning History can be recognized in the topographical data.

In accordance with a further embodiment a method of the invention is characterized, in that, when the further data structure DRD has a degree of occupancy exceeding a first threshold value, that many oldest pseudo-segments are removed from the further data structure DRD, that the new degree of occupancy is less than a second threshold value. The oldest segments are those segments that were placed first in the data structure. Overflow is prevented thus, whereas the most relevant information is preserved.

In accordance with a preferred embodiment, a method according to the invention is characterized, in that, by comparing the route segments in the data structure PSD and the pseudo-segments in the further data structure DRD, a correction vector is periodically determined for the dead reckoning coordinates. In this manner a still higher accuracy is obtained in the determination of the correction vector, which is based on the recently calculated dead reckoning coordinates and the corresponding route segments possibly passed through. Thus, from the shape of the recent Dead Reckoning History the correct route segment from PSD can be determined with a high degree of reliability.

An arrangement in accordance with the invention, is characterized, in that, the processor is further programmed to perform test steps to compare the dead reckoning coordinates to the information from the data base, the arrangement further including a first working memory for storing a dynamic local navigation data base LND, a second working memory for storing a data structure PSD incorporating route segments which on the basis of the test steps were possibly passed through, and a third working memory for storing a further data structure DRD with pseudo-segments derived from consecutively calculated dead reckoning coordinates, which form a pseudo-route, the processor periodically determining a correction vector for the dead reckoning coordinates by comparing the contents of the second and third working memories.

BRIEF DESCRIPTION OF THE DRAWING

The invention will now be described in greater detail with reference to the accompanying Tables and Figures.

Table 1 shows a pseudo-code algorithm describing the direction test;

Figure 1:
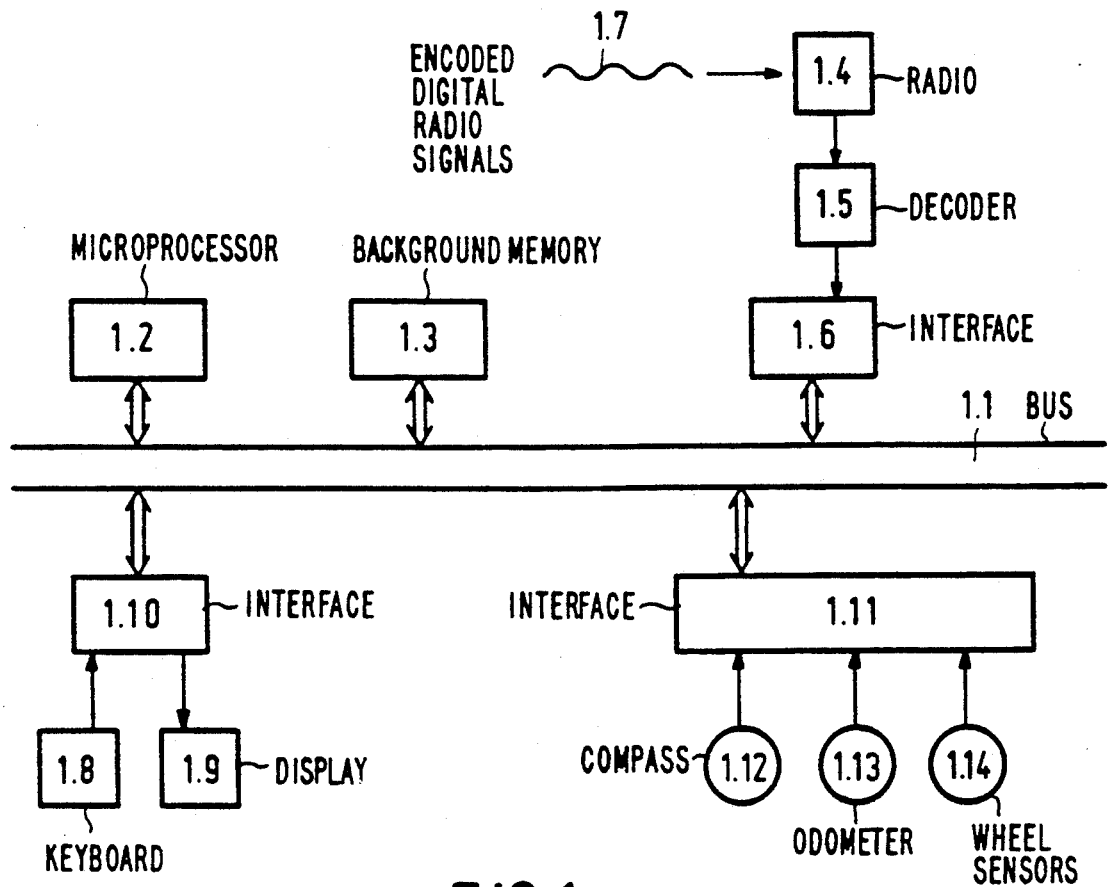
Figure 2:
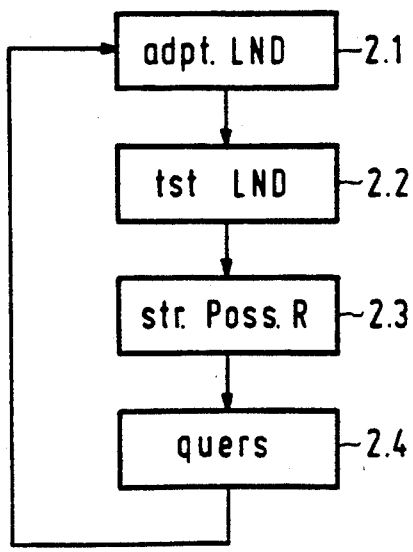
Figure 3:
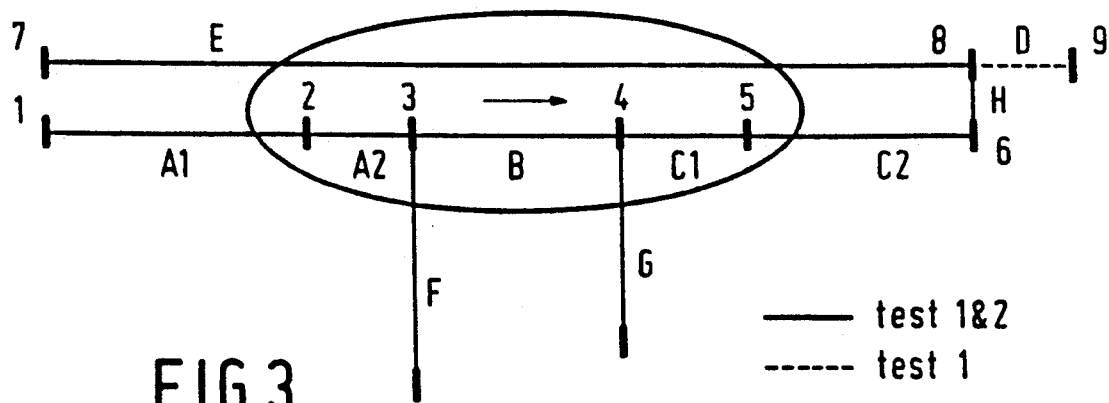
Figure 4:
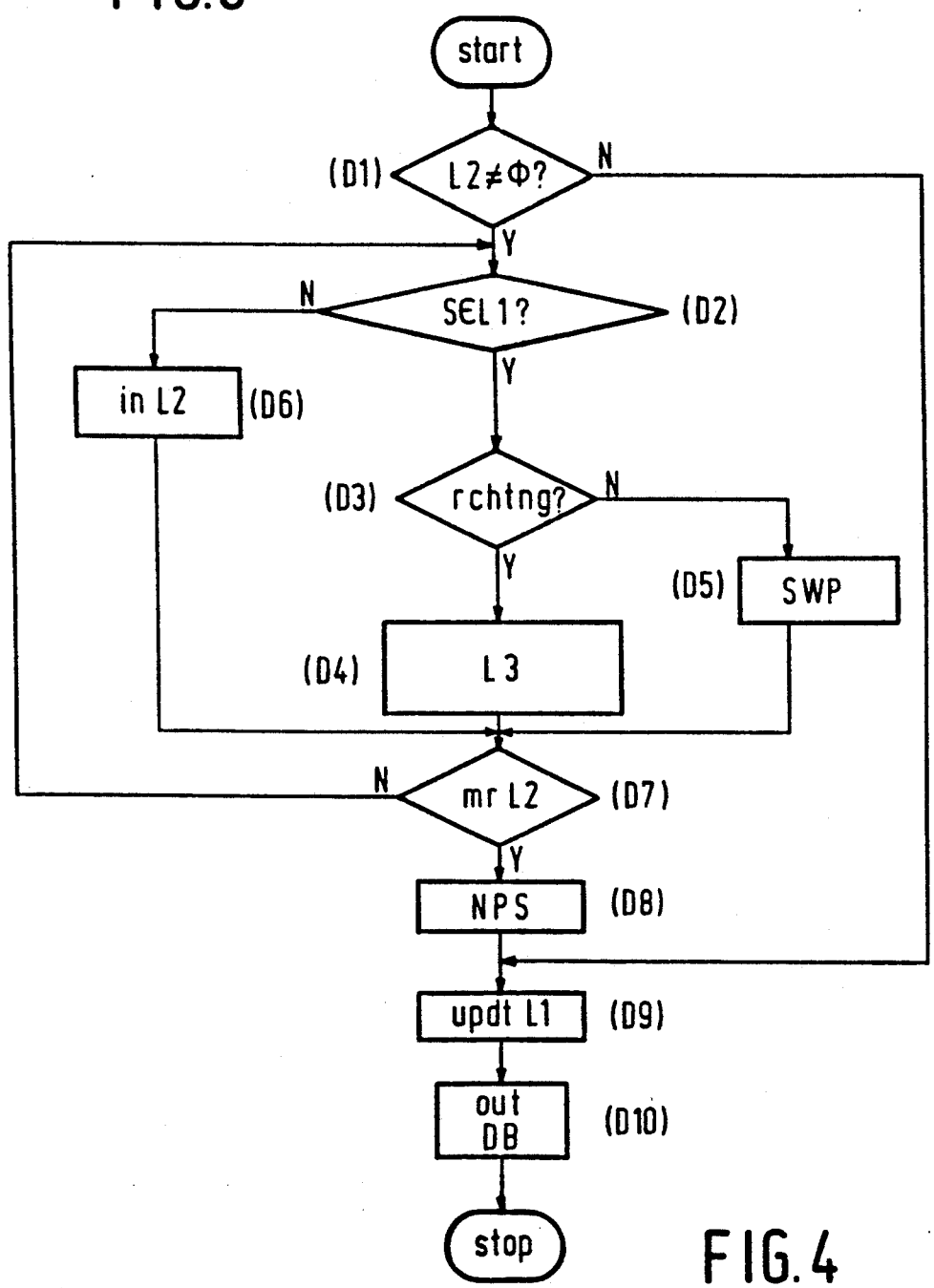
Figure 5:
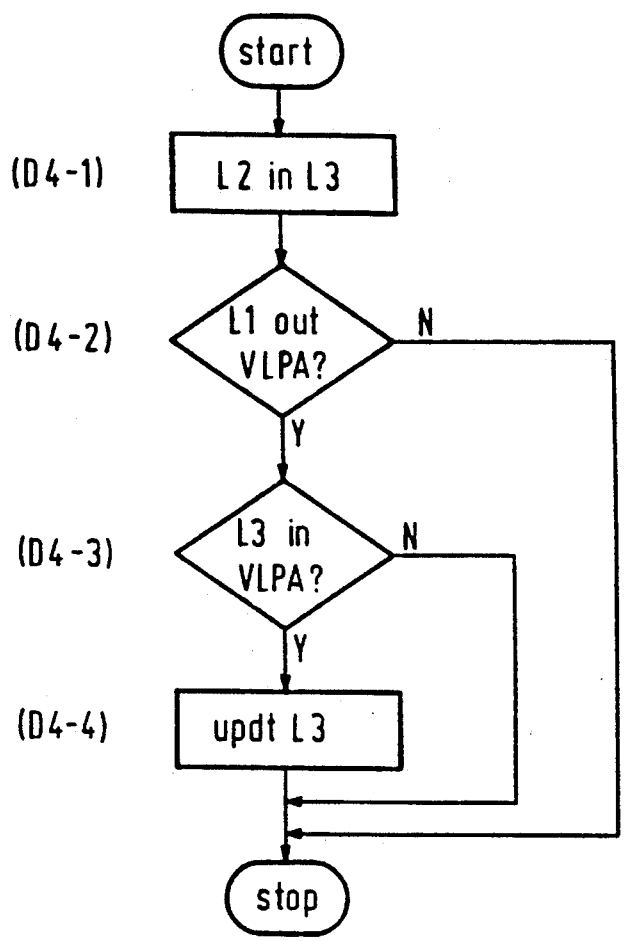
Figure 7:
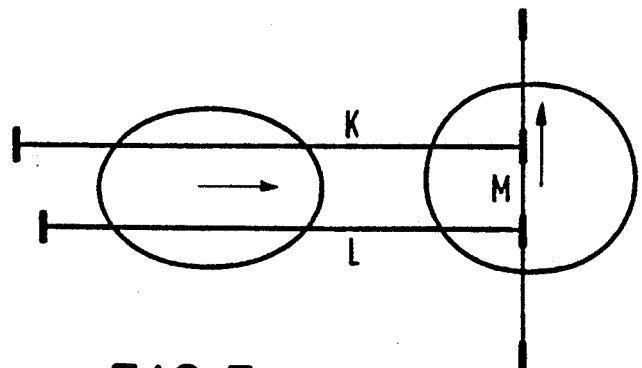
Figure 8:
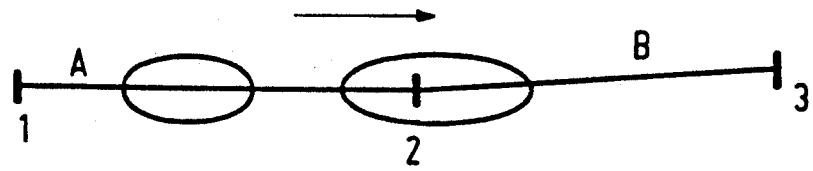
Figure 6:
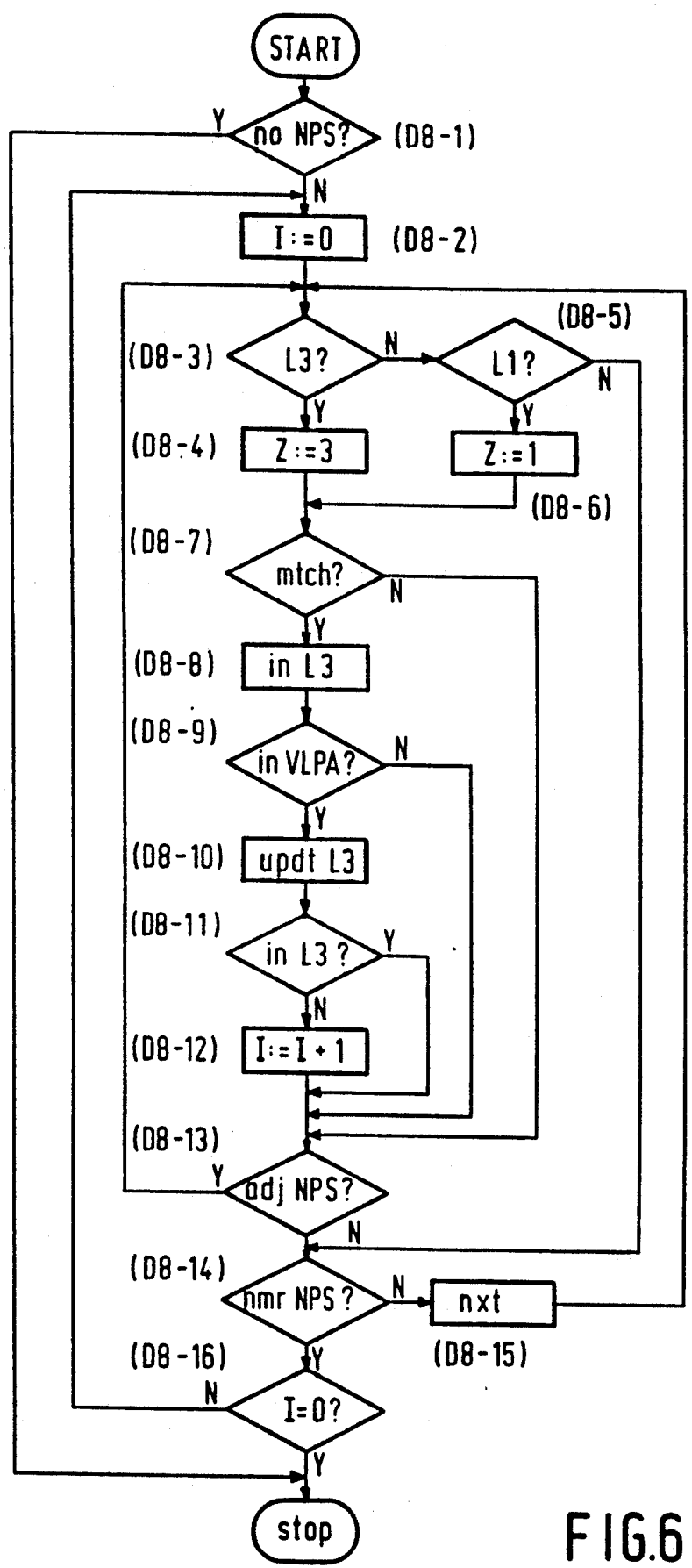
Figure 9:
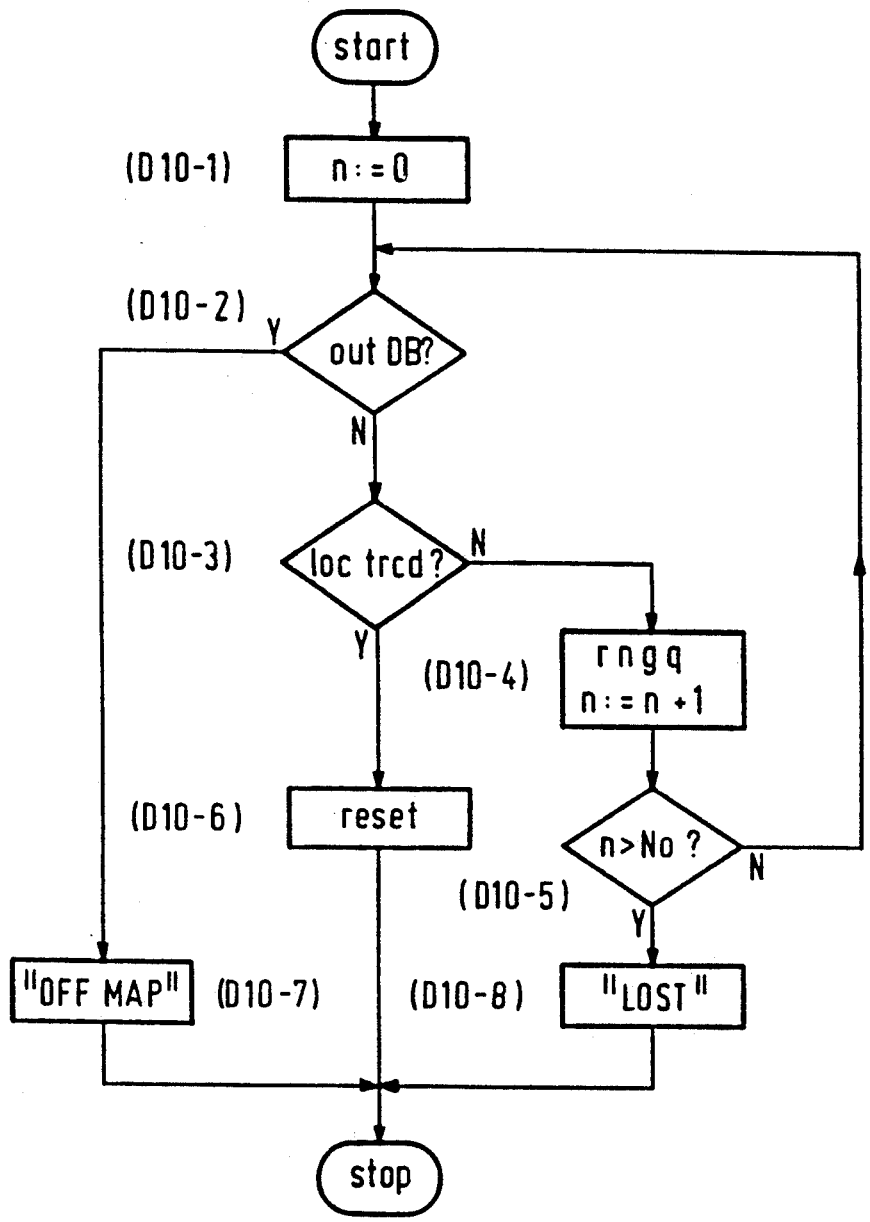
Figure 10:
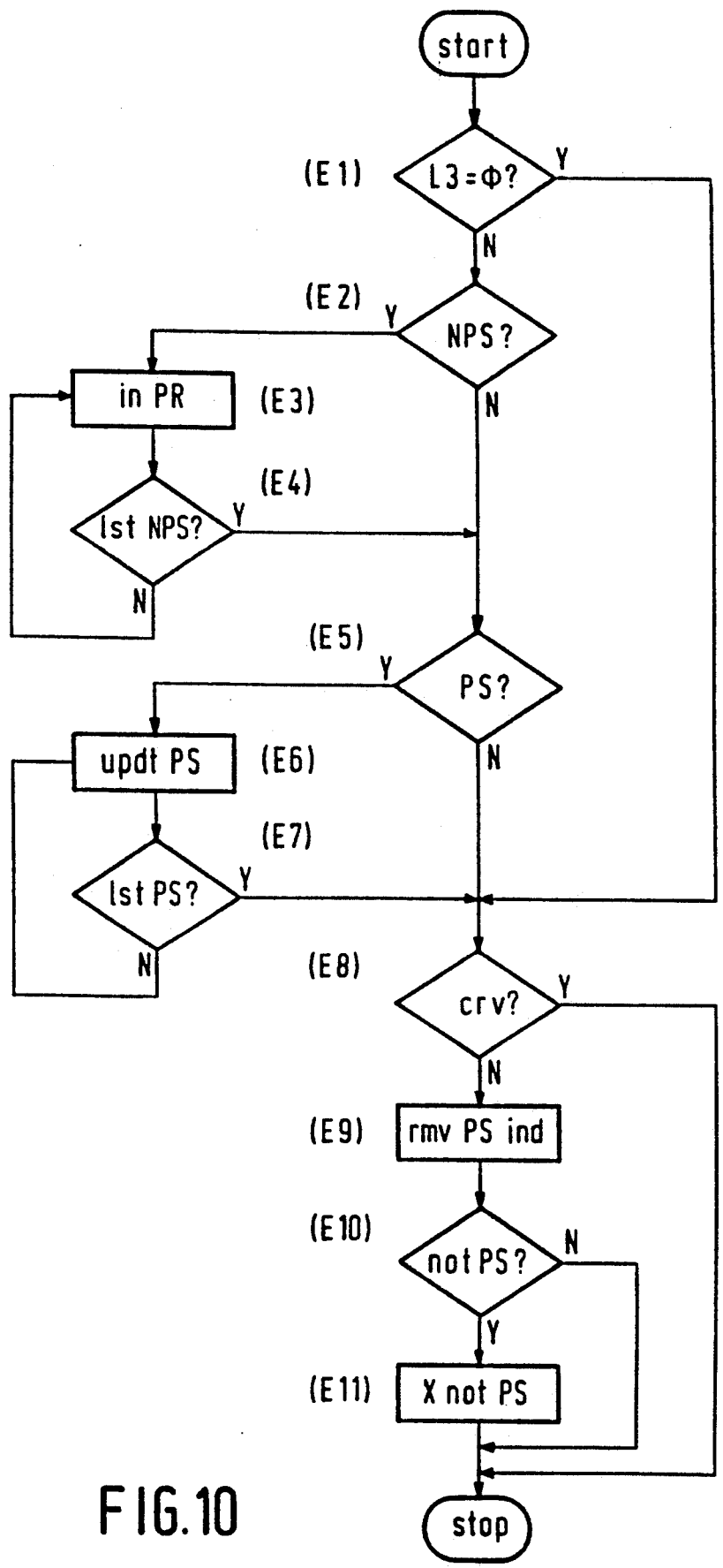
Figure 11:
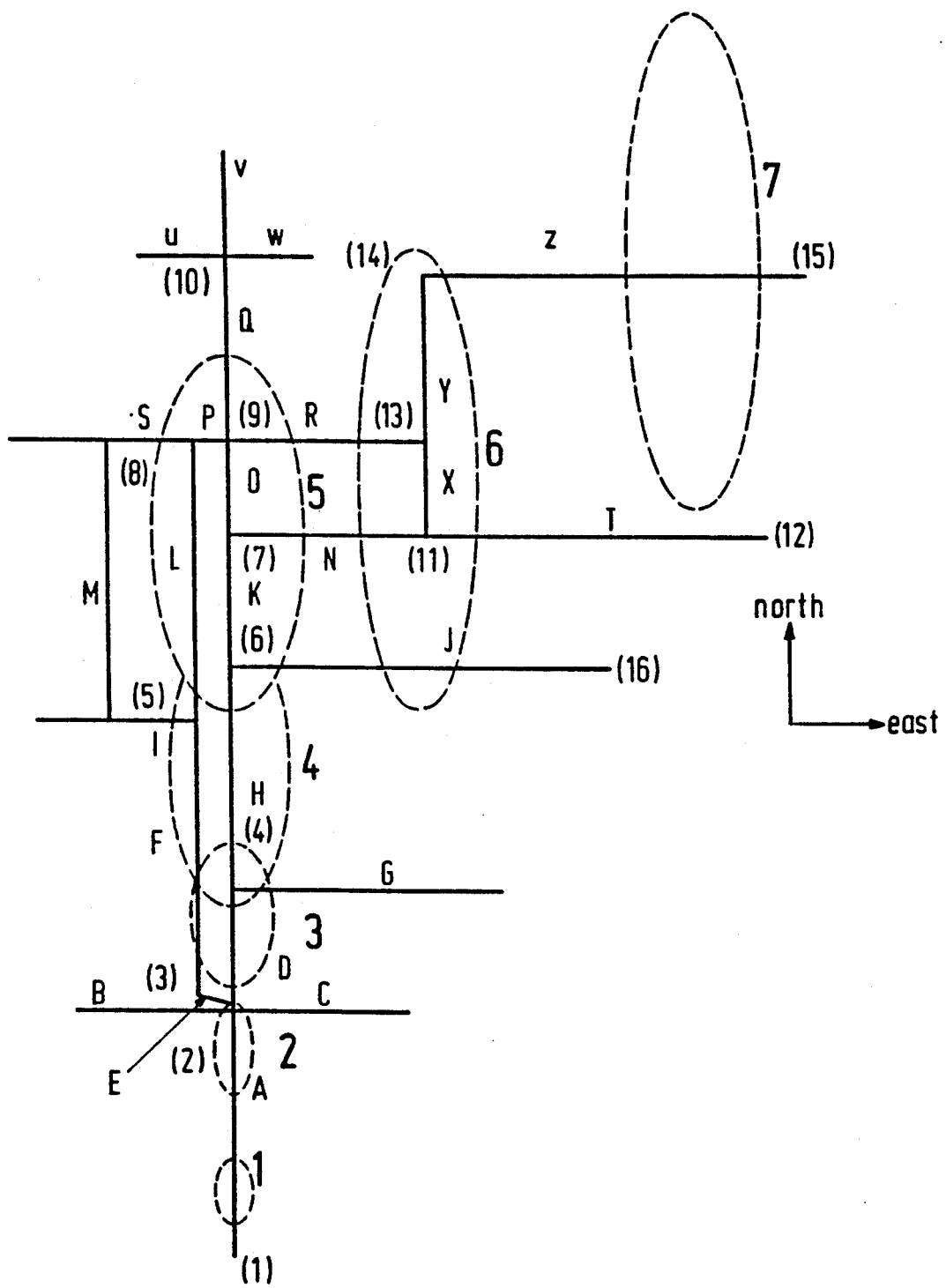
Figure 12:
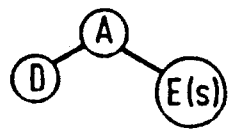
Figure 12:
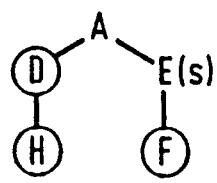
Figure 12:
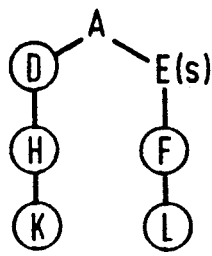
Figure 12:
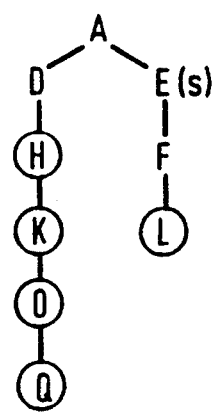
Figure 12:
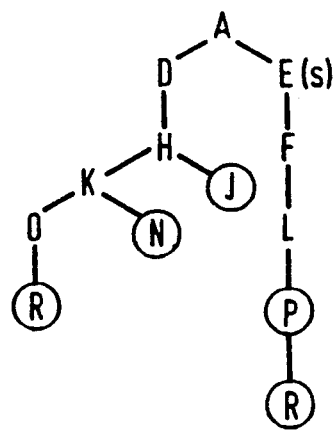
Figure 12:
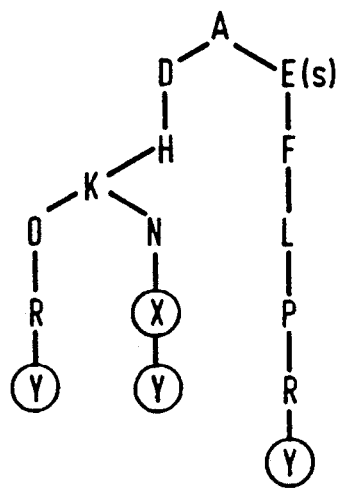
Figure 12:
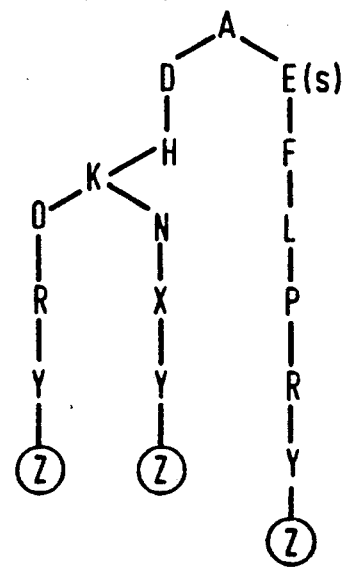
Figure 13:
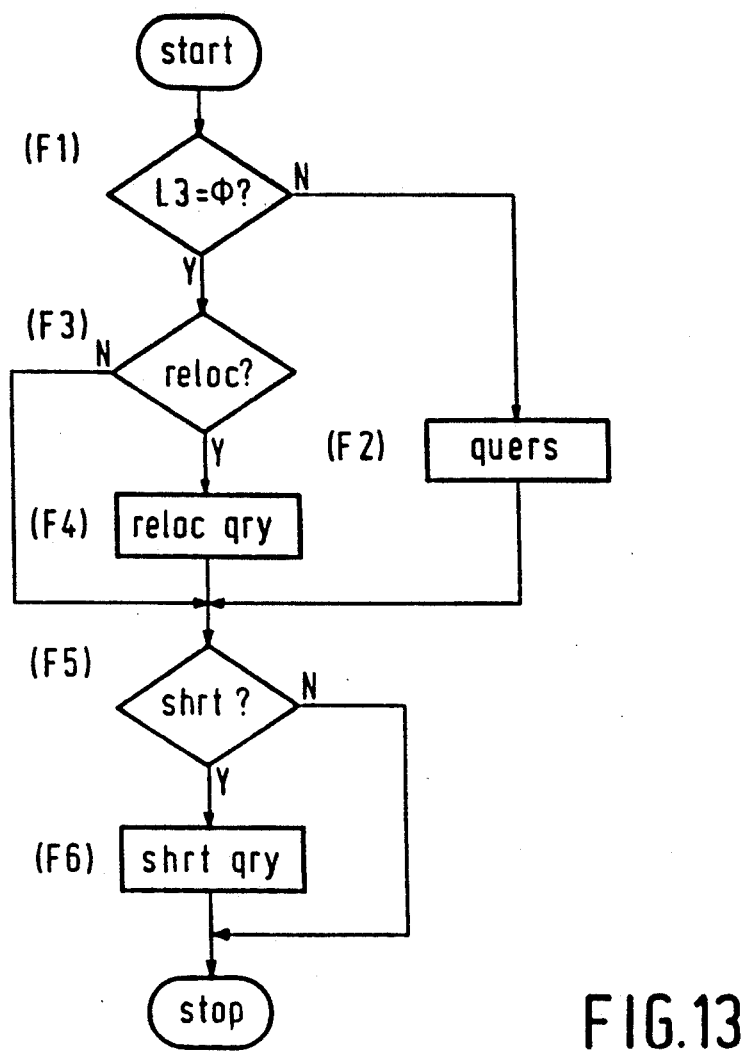
Figure 14:
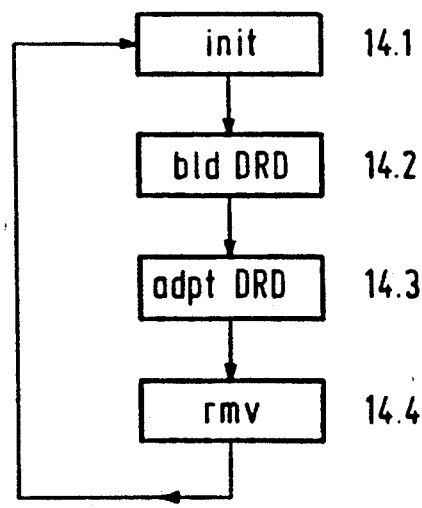
Figure 15:
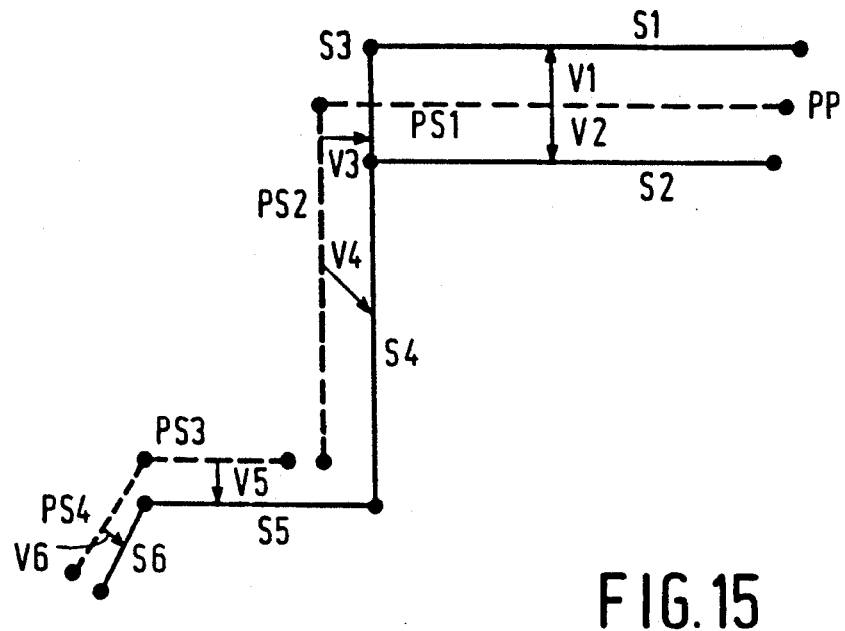
Figure 16:
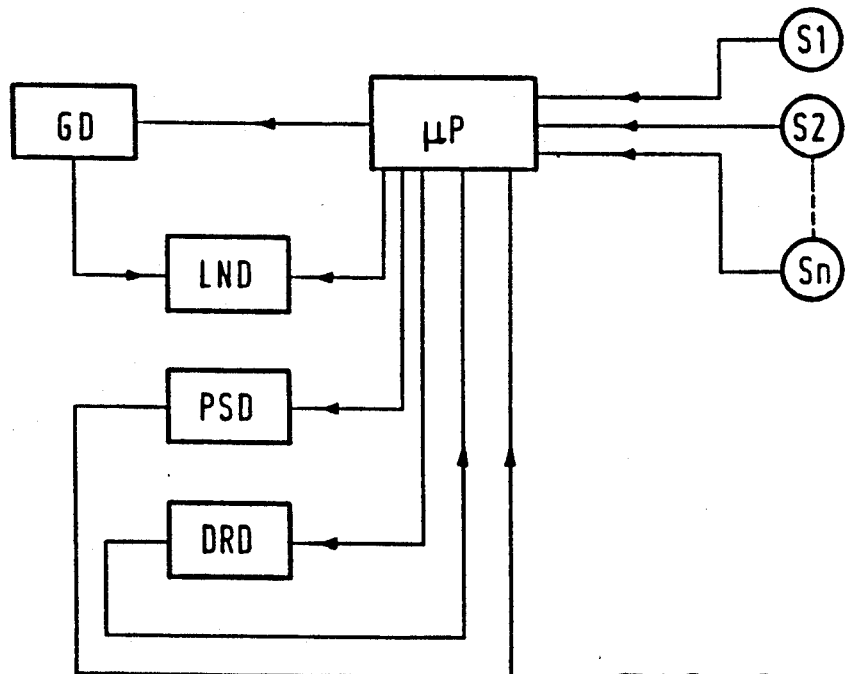

Table 2 shows an example of a list SPR containing segments with a suitable direction;

Table 3 shows an example of a list L2 containing segments which also pass the VLPA-test;

Table 4 illustrates the manner in which a segment is placed in a list L3;

Table 5 shows a pseudo-code algorithm describing the up-dating /f a list L1;

Tables 6A, 6B, 6C and 6D illustrate the implementation of the data structure PSD with the aid of list L3;

FIG. 1 shows a navigation system for a motor car;

FIG. 2 is a flow chart illustrating a method in accordance with the invention;

FIG. 3 illustrates the VLPA-test;

FIG. 4 is a flow chart describing how the list L3 is formed;

FIG. 5 is a flow chart describing a further elaboration of block D4 of FIG. 4;

FIG. 6 is a flow chart illustrating a further elaboration of block D8 of FIG. 4;

FIGS. 7 and 8 illustrate the close fitting contiguity of segments;

FIG. 9 is a flow chart illustrating a further elaboration of block D10 of FIG. 4;

FIG. 10 is a flow chart describing how data structure PSD is formed;

FIG. 11 illustrates the implementation of the data structure PSD on the basis of a part of a road system;

FIG. 12 shows tree structures to illustrate the Tables 6A, 6B, 6C and 6D;

FIG. 13 is a flow chart describing how new data can be requested from the global data base;

FIG. 14 is a flow chart illustrating a further method in accordance with the invention;

FIG. 15 illustrates the determination of a correction vector;

FIG. 16 shows an arrangement according to the invention.

DESCRIPTION OF THE PREFERRED EMBODIMENTS

A navigation and information system for motor cars of a type as, for example, CARIN (Car Information and Navigation System) periodically determines the position of the vehicle, determines the best route, guides the driver by means of speech synthesizer or a display panel for symbols, selects an alternative route when encoded digital radio signals report traffic jams and can additionally provide touristic information.

For the storage of digital data representing the required topographical and traffic technical information (such as roads, crossings with priority rules, traffic lights, number of lanes or width of the roads, inclination, road category, speed limits etc.), the Compact Disc is used in CARIN.

FIG. 1 shows a navigation system for a motor car. Via bus 1.1 there are interconnected a microprocessor 1.2 and a background memory 1.3 with a global data base containing topographical and traffic technical information (for example a CD having a storage capacity of 4800 Mbit). In addition to the known radio signals a radio 1.4 also receives encoded digital radio signals 1.7 containing information about the actual state of the traffic. These signals are decoded in decoder 1.5 which is connected to bus 1.1 via an interface 1.6. A keyboard 1.8 is in connection with bus 1 via an interface 1.10, as is also a display 1.9 which comprises a monitor and an electronic speech synthesizer with loudspeakers for the display and reproduction of traffic technical and navigation data. Via an interface 1.11 the microprocessor 1.2 periodically determines with the aid of compasses 1.12 (an optical fiber gyroscope, for example), an odometer 1.13 and wheel sensor 1.14 dead reckoning coordinates which represent the actual position of the vehicle.

The topographical and traffic technical information can be digitized in several different ways. The raster scanning method, for example, operates as follows. A road map (for example having a scale of 1:100,000) is divided into picture elements (pixels) of, for example, 0.1 mm×0.1 mm. The colour of each pixel is represented by a digital code. A further method, which requires much less storage capacity, is the vector method. In this method the road axes are approximated by straight line sections which each represent a vector. An end point of a vector fulfilling certain conditions is called node or 0-cell, A vector or series of vectors interconnecting two nodes, is denoted chain or 1-cell. A surface area surrounded by chains is designated 2-cell. The notions 0-cell, 1-cell and 2-cell are known from topology; see S. Lefschetz, "Introduction to topology", Princeton University Press, Princeton, N.J., 1949.

In the methods to be discussed for the determination of the position of the vehicle it is assumed that the digitizing has been effected in accordance with the vector method.

In the sequel of this description the composite vectors of a chain between two nodes will be designated route segments or, simply segments. The global data base with topographical and traffic technical data has the following structure.

The network of roads is translated into a graphical structure of points connected by straight line sections, so-called segments. The position of each point is given by two coordinates (for example Cartesian). There are two types of points: nodes an intermediate points. A node may be:
  a point where more than two segments coincide;
  a crossing with the edge of the map or with another artificial boundary;
  a crossing with an administrative boundary;
  the end of a cul-de-sac;
  a point where for a street an added item changes (for example its name or road category).

All other points are denoted intermediate points. These points are found, for example, at a curve in the road or are used to approximate the curvature of a road by straight segments. Nodes are interconnected by chains, formed by one or a plurality of segments. The graphic structure formed by the chains is the skeleton of the digitized map, to which further items are added, such as street names, road categories, one-way stipulations etc. This large quantity of data is subdivided in what are called parcels or buckets.

For the determination of the actual position of the vehicle the processor calculates each time the dead reckoning coordinates, on the basis of measured navigation-parameters such as direction of travel and number of revolutions of the wheels.

Due to measuring errors, round-off errors etc. the calculated actual position may deviate from the real actual position. Such errors can be split into systematic errors and random errors. Systematic errors in the measuring results can be eliminated by calibration. The magnitude of random errors can be estimated, and can be expressed by means of what is called the VLPA (Vehicle Location Probability Area). This probability area around the dead reckoning coordinates is in the shape of an ellipse whose dimensions are determined by laws for the propagation of random errors.

So as now to be able to determine the actual position of the vehicle to an improved extent, the dead reckoning coordinates are compared to the topographical and traffic technical information such as it is stored in the global data base.

This information is of an enormous bulk and must be made manageable. To that end a local navigation-data base (LND) is being kept and updated containing subinformation on which test steps can be performed on the basis of which possibly driven route segments from the LND are stored in a data structure. FIG. 2 shows a flow chart for this procedure. In block 2.1 the LND is adapted to the actual situation. This is done as follows.

First answers are received to earlier requests for data to the global data base, so-called queries. Thereafter additional required quantities are calculated (for example, the length or the direction of a segment). Then the answers are stored in the LND. Finally superfluous data are removed from the LND.

The LND consists of three parts: a chain list KL, a segment list SL and a new data list NL. These lists are preferably linked list structures, which have the advantage that they are of a variable length. This is important for the dynamic behaviour of the LND. In such a linked list structure data entities are linked by means of pointers. The advantage thereof compared to the use of arrays is that the dimensions of the structure need not to be predetermined. The chain list KL contains the specific chain information not required for each segment. For each chain this list contains the following items:

chain number (CD-number, parcel address, chain index number);
starting node (node index number);
pointer to list with other chains from starting node;
end node;
pointer to list with other chains from end node;
number of segments of the chain;
road category (for example motor way, B-road);
status (of the chain: for example bridge, viaduct);
one-way traffic (four possibilities);
slope (for example a number from 1 to 15, representing a range of percentages of inclination).

Said lists with other chains (linked lists) contain:
chain number (CD-number, parcel address, chain index number);
number of intermediate points;
starting node;
end node.

The segment list SL contains:
segment number (CD-number, parcel address, chain index number, segment index number);
segment direction;
segment length;
number of intermediate points of the segment;
starting point (node or intermediate point);
end point.

The new data list NL has the same structure as the segment list SL; the most recently entered segments are listed therein. Using these lists, answers can be found to queries to the LND such as:

give all the segments whose direction does not differ for more than a treshold value from the current direction of travel of the vehicle;
give the most recently entered segments;
give information about a predetermined chain;
give for a given chain and its starting or end nodes the other chains of that node;
give the direction of a given segment.

When queries to the global data base furnish data, these data are entered in the LND and any additionally required quantities are calculated. The content of the LND is limited by regularly removing the chains which are no longer relevant (which are, for example, not located near the current position anymore) from the LND.

After this updating of the LND a number of test steps are performed in block 2.2 on the data in the LND, to determine via which chains or segments the vehicle has travelled.

A first possible test is the directional test: directions of segments $\phi s$ are compared to the current direction of travel $\phi v$ of the vehicle as determined from the calculated dead reckoning coordinates. When the acute angle $\Delta \phi$ between a segment and the direction of travel is less than a predetermined threshold value T, the relevant segment is placed in a list SPR of segments having a suitable direction. Also the relevant acute angle $\Delta \phi$ is stored in this list. When a segment and the direction of travel have directions which differ substantially 180° from each other, a correction of 180° is performed on the direction of the segment, and the corrected direction is also stored in the list SPR, as well as a boolean value RV which indicates that a correction has been effected. If this boolean value RV is TRUE, the correction has been effected and the vehicle drives in the opposite direction through the segment. With the aid of this boolean value RV which indicates whether the direction has been corrected or not, it is possible to define the starting and the end points of a segment: the vehicle always drives from the starting to the end point. When the vehicle drives in the reverse direction, an additional correction is made. The threshold value T of this test depends on the length of the segment to be tested. For short segments a higher threshold value is used, as the directional test is less accurate in the case of small segments, and the presence of short segments may be the result of inaccuracies in the digitization of the map. The segment numbers are retrieved together with their directions and length from the LND, and are compared with the direction of travel of the vehicle. Also additional data such as coordinates can be retrieved from the LND and listed in the list SPR, so that they are rapidly available for use. The direction of travel of the vehicle is determined from the calculated dead reckoning coordinates, whilst optionally an average over a number of consecutively found directions can be taken to avoid small fluctuations. The direction of travel is stored in the memory location NP with navigation parameters. In addition, there is a memory location VR in which the previous direction of travel has been stored. The directional test can be represented as follows, with the aid of PSEUDO-CODE (see Table 1):

TABLE 1

IF vehicle has a constant direction of travel $\phi v$
THEN compare $\phi v$ to $\phi s$ of new segments (of list NL)
ELSE compare $\phi v$ to $\phi s$ of all segments from LND.

If the difference between the direction stored in memory location VR and the direction from memory location NP is below a given threshold value T1, then the vehicle has a substantially constant direction of travel and the directional test can be significantly simplified: only newly added segments (in new data list NL) need to be checked. All the other segments having a suitable direction are already listed in list SPR; new suitable segments are added. When there is too big a difference in direction, all the segments of LND must be checked, after list SPR has been emptied. Also the length of suitable segments can be stored in list SPR, for later usage.

A further possible test is the VLPA-test. As has already been described in the foregoing, a probability area is determined in a car navigation system such as CARIN around the calculated dead reckoning coordinates, the so-called VLPA. This ellipse-shaped area can be approximated for calculation technical reasons by a rectangle enclosing the area, having sides parallel to the main axes of the ellipse and having a minimal surface area (so tangent to the ellipse). In the VLPA-test it is checked whether segments from list SPR are located in the relevant VLPA. Segments which also satisfy this requirement, are entered in a list L2. The following items of a segment which has the proper direction and is located in the VLPA are entered in L2:

segment number (CD-number, parcel address, chain index number, segment index number);
segment direction;
boolean RV;
angle $\Delta\phi$;
segment length;
number of intermediate points of the chain;
starting point of the segment (index number of the intermediate point);
boolean B1: starting point inside or outside the VLPA;
coordinates of the starting point;
end point of the segment (index number of the intermediate point);
boolean B2: end point inside or outside the VLPA;
coordinates of the end point;
index indicating whether the segment has the status "route segment possibly driven".

Most items can be copied from list SPR to list L2. See FIG. 3 and Tables 2 and 3. It should be noted that in Tables 2 and 3 and in the sequel of this description only relevant items of the represented lists are shown.

TABLE 2

| segm nr | rchtng | RV | $\Delta\phi$ |
|---|---|---|---|
| A1 | 91 | false | 1 |
| A2 | 89.2 | false | 0.8 |
| B | 90.5 | false | 0.5 |
| C1 | 89.5 | false | 0.5 |
| C2 | 91.5 | false | 1.5 |
| D | 90.9 | false | 0.9 |
| E | 90 | false | 0 |

TABLE 3

| segm nr | rchtng | RV | $\Delta\phi$ | bp | B1 | ep | B2 | index |
|---|---|---|---|---|---|---|---|---|
| A2 | 91 | false | 1 | 2 | inside | 3 | inside | — |
| A1 | 89.2 | false | 0.8 | 1 | outside | 2 | inside | — |
| B | 90.5 | false | 0.5 | 3 | inside | 4 | inside | — |
| C1 | 89.5 | false | 0.5 | 4 | inside | 5 | inside | — |
| C2 | 91.5 | false | 1.5 | 5 | inside | 6 | outside | — |
| E | 90 | false | 0 | 7 | outside | 8 | outside | — |

In FIG. 3 the vehicle drives to the right and has a direction of travel of 90°. As is shown in Tables 2 and 3, 6 of the 7 segments satisfy the VLPA-test.

The list L2 thus obtained contains segments which are condidates for being marked as "route segments possibly driven" (P.S.). Thereafer it is determined, by means of additional tests, which segments have at that instant the status of P.S. It is checked whether a segment is properly contiguous to a preceding P.S.. Three lists are used:

L1 containing preceding P.S. (so segments which at the previous determination of the P.S. were possibly driven route segments);
L2 containing segments having the proper direction and being located in the relevant VLPA;
L3 with instantaneous P.S. (so segments of L2 which passed the additional tests).

With the lists L1 and L2 as the input, it is now determined which segments will be entered in list L3. See FIG. 4. In block D1 it is checked whether list L2 is empty. In that case no tests are required since there are no candidates. If L2 is not empty, first the preceding P.S. are checked in list L1. Thereafter the new P.S. are processed in block D8. In block D2 a segment S is chosen from L2 and it is checked whether S is also listed in L1. If not, then in block D6 a "new P.S."-index is added in list L2 to S. If segment S is indeed included in L1, consequently was P.S. already at a previous instant, S is further processed in blocks D3, D4 and D5. The direction of travel of S in L2 is compared in block D3 to the direction of travel of S in L1. If the two directions differ by approximately 180°, the vehicle has changed its direction of travel. This is processed in block D5. If the directions agree, segment S is entered in list L3 in the following manner (block D4, shown in greater detail in FIG. 5). In block D4-1 all the information about segment S from list L2 is entered in list L3 (segment number, direction, boolean RV, angle $\Delta\phi$, length, number of intermediate points of the chain, starting and end points and their coordinates, booleans B1 and B2). Of segment S only the information about the contiguous, preceding segment from the starting point and the contiguous segments (with directions) from the end point, in so far these segments are included in L1, is copied from list L1 to list L3. Now L1 is compared to L3. In blocks D4-2 and D4-3 it is checked whether the end point of segment S was first located (in L1) outside the VLPA and now (in L3) within the VLPA. In that case it is determined in block D4-4 which are the contiguous segments of the end point and these segments together with their associated directions are entered as attributes to S in L3. When the end point is an intermediate point, there is one relevant contiguous segment in the same chain, determined by boolean RV which indicates whether the direction of travel is corrected or not. Thus, for example, the contiguous segment of a segment having an index number 2 in a chain, if RV is TRUE, is the segment having index number 1. If the end point is a node, the contiguous chains of the end point are searched for in the chain list KL of the LND. Also the directions of the contiguous segments are entered into list L3. These directions can be found in the segment list SL of the LND. When the direction of travel is changed (block D5) the starting point and the end point are interchanged, and thereafter the procedure is similar to the foregoing. In block D7 it is checked whether the last segment of L2 has already been processed. If not, block D2 is returned to. When all the segments have been processed, the new P.S. (provided with an index in block D6) are processed; see block D8, further elaborated in FIG. 6. In block D8-1 it is checked whether there are new P.S. If no, then ready, if yes, then the counter I is initialized at zero in block D8-2. In the blocks D8-3 and D8-4 it is now checked for a newly chosen P.S., for example, S, whether it is contiguous to a segment already being a P.S. (is included in L3). If yes, then the value 3 is assigned to the variable Z. If no, it is checked in blocks D8-5 and D8-6 whether S is contiguous to a segment from L1. If yes, the value 1 is assigned to the variable Z, if no, then proceed to block D8-14. In block D8-7 it is checked whether S had not already been entered into L3 in an earlier iteration step (see block D8-12) and whether the direction of S fits the direction of the contiguous segment in list Z (Z=1 or Z=3). As is shown in FIG. 7, being contiguous to another segment is not always sufficient: segment M is contiguous to both segment K and segment L, but the direction of M does not match the direction of K, so that M can only be fittingly contiguous to L. In block D8-8 the new P.S. is entered into L3. Most items of list L2 are again entered into list L3; the end point of the contiguous segment in list Z becomes the starting point of this new P.S. S. The segment number of the segment in list Z is arranged under "preceding segment" at the starting point of the now newly added P.S. S in L3. By adding the preceding segment it is avoided that the same combination of segments is stored repeatedly in list L3 (see block D8-7). Moreover, using an index it is indicated that this segment is a "new, possibly driven route segment" (N.P.S.). If the segment is the first segment of its chain that is entered into L3, it is given the status N.P.C.: new possible chain.

of two streets running into a crossing where he is at that moment, using keyboard 1.8. Finally, in block D10 action is taken for the case in which the vehicle is outside the area mapped on the data base. See FIG. 9. In block D10-1 a counter n is initialized at zero. In block D10-2 it is checked whether the vehicle is outside the mapped data base area. If yes, the signal "OFF MAP" is generated in block D10-7. If no, then it is checked in block D10-3 whether the location of the vehicle is known with sufficient certainty. If not, for example when the vehicle is parked in a large parking lot, a what is called "range query" is effected in block D10-4, that is to say: all data from a given sub-area of the data base (for example a rectangle) are requested. In addition, the

TABLE 4

| segm nr | rchtng | RV | $\Delta\phi$ | bp | B1 | vsgm | ep | B2 | asgm | $\phi_a$sgm | index |
|---|---|---|---|---|---|---|---|---|---|---|---|
| A | 90 | false | 0.5 | 1 | outside | — | 2 | inside | B | 90 | P.S. |

| segm nr | rchtng | RV | $\Delta\phi$ | bp | B1 | ep | B2 | index |
|---|---|---|---|---|---|---|---|---|
| A | 90 | false | 0.5 | 1 | outside | 2 | inside | — |
| B | 88 | false | 1.5 | 2 | inside | 3 | outside | N.P.S. |

| segm nr | rchtng | RV | $\Delta\phi$ | bp | B1 | vsgm | ep | B2 | a sgm | $\phi$asgm | index |
|---|---|---|---|---|---|---|---|---|---|---|---|
| B | 88 | false | 1.5 | 2 | inside | A | 3 | outside | — | — | N.P.S. |
| A | 90 | false | 0.5 | 1 | outside | — | 2 | inside | B | 90 | P.S. |

FIG. 8 and Table 4 show an example of how a N.P.S., B, contiguous to segment A of L3, is entered into L3. Segment A has already been entered into L3, segment B is a N.P.S. in L2 and is entered contiguous to A into L3 (the three sub-tables of Table 4). In block D8-9 it is checked whether the end point of the just added N.P.S. is already included in the VLPA; then a short segment KS is involved. In that case, in block D8-10 the contiguous segments of the end point and their directions are determined and entered as an attribute to KS in list L3, just like in block D4-4. The segment is provided with the proper index. In block D8-11 it is checked whether a segment newly entered into L3 with end point in the VLPA is not already included in L3 contiguous to another segment in a previous iteration step. If so, then the counter I is not incremented in block D8-12. In the other case said counter I is incremented by 1 in block D8-12. If counter I exceeds zero after all the N.P.S. have been checked, a subsequent iteration step is necessary: it is namely possible that there are still further N.P.S. contiguous to the newly added N.P.S. with end point in the VLPA. In block D8-13 it is checked whether a new N.P.S. is contiguous to yet another P.S. of list L1 or list L3. If yes, then blocks D8-3 to D8-13, inclusive, are repeated. In block D8-14 it is checked whether the last N.P.S. has already had its turn. If no, then a next N.P.S. is selected in block D8-15. In block D8-16 it is checked whether I is zero. If not, a subsequent iteration step is required. In block D9 (FIG. 4), after all the N.P.S. have been processed in D8, list L1 is updated. This updating can be represented as follows in PSUEDO-CODE (see Table 5).

TABLE 5

IF L3 empty or curve
THEN add any segments of L3 not included in L1 to L1
ELSE replace L1 by L3

For an excessively large number of possibly driven route segments (exceeding an adjustable threshold value) the signal "LOST" is generated. This signal indicates that the user must perform (manually) a relocalization. He can do so by, for example, entering the names counter n is incremented by one. Thereafter, in block D10-5, it is checked whether counter n has in the meantime exceeded a (presettable) threshold value $N_0$. If not, a return to block D10-2 is made. If yes, then the signal "LOST" is generated in block D10-8: a manual relocation is necessary. If after a number of range queries (not more than $N_0$) the spot where the vehicle is located is known with sufficient certainty, a reset is performed in block D10-6.

In this way the possibly driven route segments P.S. for the current situation have been determined.

These segments are now entered into a (tree-like) linked list data structure PSD (block 2.3 of FIG. 2). Non-relevant parts ("branches" of the tree) are removed. The central item in the data structure is the segment with its attributes (segment number, segment direction, boolean RV, angle $\Delta\phi$, segment length, road category, chain status, one-way stipulations, slope, P.S. index). A number of these attributes are determined by queries to the chain list KL of the LND. Furthermore, starting and end points of each segment are stored, each together with the following attributes: point numbers, coordinates, booleans indicating whether the points are inside or outside the VLPA. For each segment (the first segment in the structure excepted) also its predecessor is stored (the contiguous segment of the starting point where the vehicle comes from). Each segment has zero, one or more successors, which are contiguous to the end point and are also stored in the structure. All the contiguous segments have the same attributes as above.

All this is illustrated in FIG. 10. In block E1 it is checked whether list L3 is empty. If not, then all the N.P.S. of L3 are first entered in the blocks E2, E3 and E4, into the structure PSD. Thereafter, in the blocks E5, E6 and E7 the remaining P.S. of L3 (which had already been P.S. before) are updated in the data structure PSD.

In the blocks E8, E9, E10 and E11 branches which are not possible are removed from the tree-like structure PSD. Unless a curve is being driven (block E8) all the P.S. indices of segments no longer included in L3 are removed in block E9. Finally, in blocks E10 and E11, the superfluous branches are removed: if the last segment of a branch is not P.S. anymore in a plurality of consecutive determinations of the possibly driven route segments (for example x times). The entire branch may then be removed. The threshold value x is introduced to avoid that branches are inadvertently removed, for example when the vehicle is overtaking. The construction of the data structure PSD will be explained on the basis of an example.

FIG. 11 shows a portion of a road system having segments A to Z, and also 7 consecutive VLPA's. The possibly driven route segments P.S. are determined at each VLPA and are entered into list L3. Using L3 and the preceding possible routes, the actual possibly driven routes PR are determined and entered into the data structure PSD each time. For the sake of clarity, let it be assumed that the vehicle in this example only drives in the directions north or east. The items direction, boolean RV and angle $\Delta\phi$ are therefore not taken into consideration here.

TABLE 6A

Situation 1

| segm nr | bp | B1 | vsgm | ep | B2 | index |
|---|---|---|---|---|---|---|
| A | 1 | out | — | 2 | out | N.P.C. |

| PR index nr | segm nr | bp | B1 | vsgm | ep | B2 | index |
|---|---|---|---|---|---|---|---|
| 1 | A | 1 | out | — | 2 | out | P.S. |

Situation 2

| segm nr | bp | B1 | vsgm | ep | B2 | index |
|---|---|---|---|---|---|---|
| A | 1 | out | — | 2 | in | P.S. |
| D | 2 | in | A | 4 | out | N.P.C. |
| E | 2 | in | A | 3 | out | N.P.C. |

| PR index nr | segm nr | bp | B1 | vsgm | ep | B2 | index |
|---|---|---|---|---|---|---|---|
| 1 | A | 1 | out | — | 2 | in | P.S. |
| 2 | D | 2 | in | A | 4 | out | P.S. |
| 1-1 | E | 2 | in | A | 3 | out | P.S. |

Situation 3

| segm nr | bp | B1 | vsgm | ep | B2 | index |
|---|---|---|---|---|---|---|
| D | 2 | out | A | 4 | in | P.S. |
| H | 4 | in | D | 6 | out | N.P.C. |
| F | 3 | out | E | 5 | out | N.P.C. |

| PR index nr | segm nr | bp | B1 | vsgm | ep | B2 | index |
|---|---|---|---|---|---|---|---|
| 1 | A | 1 | out | — | 2 | in | |
| 2 | D | 2 | out | A | 4 | in | P.S. |
| 1-1 | E | 2 | in | A | 3 | out | |
| 3 | H | 4 | in | D | 6 | out | P.S. |
| 21 | F | 3 | out | E | 5 | out | P.S. |

TABLE 6B

Situation 4

| segm nr | bp | B1 | vsgm | ep | B2 | index |
|---|---|---|---|---|---|---|
| D | 2 | out | A | 4 | in | P.S. |
| H | 4 | in | D | 6 | in | P.S. |
| K | 6 | in | H | 7 | out | N.P.C. |
| F | 3 | out | E | 5 | in | P.S. |
| L | 5 | in | F | 8 | out | N.P.C. |

| PR index nr | segm nr | bp | B1 | vsgm | ep | B2 | index |
|---|---|---|---|---|---|---|---|
| 1 | A | 1 | out | — | 2 | in | |
| 2 | D | 2 | out | A | 4 | in | P.S. |
| 1-1 | E | 2 | in | A | 3 | out | |
| 3 | H | 4 | in | D | 6 | in | P.S. |
| 2-1 | F | 3 | out | E | 5 | in | P.S. |
| 4 | K | 6 | in | H | 7 | out | P.S. |
| 3-1 | L | 5 | in | F | 8 | out | P.S. |

Situation 5

| segm nr | bp | B1 | vsgm | ep | B2 | index |
|---|---|---|---|---|---|---|
| H | 4 | out | D | 6 | in | P.S. |
| K | 6 | in | H | 7 | in | P.S. |

TABLE 6B-continued

| | | | | | | |
|---|---|---|---|---|---|---|
| L | 5 | out | F | 8 | in | P.S. |
| O | 7 | in | K | 9 | in | N.P.C. |
| Q | 9 | in | O | 10 | out | N.P.C. |

| PR index nr | segm nr | bp | B1 | vsgm | ep | B2 | index |
|---|---|---|---|---|---|---|---|
| 1 | A | 1 | out | — | 2 | in | |
| 2 | D | 2 | out | A | 4 | in | |
| 1-1 | E | 2 | in | A | 3 | out | |
| 3 | H | 4 | out | D | 6 | in | P.S. |
| 2-1 | F | 3 | out | E | 5 | in | |
| 4 | K | 6 | in | H | 7 | in | P.S. |
| 3-1 | L | 5 | out | F | 8 | in | P.S. |
| 5 | O | 7 | in | K | 9 | in | P.S. |
| 6 | Q | 9 | in | O | 10 | out | P.S. |

TABLE 6C

Situation 5A

| segm nr | bp | B1 | vsgm | ep | B2 | index |
|---|---|---|---|---|---|---|
| R | 9 | in | O | 13 | out | N.P.C. |
| N | 7 | in | K | 11 | out | N.P.C. |
| J | 6 | in | H | 16 | out | N.P.C. |
| P | 8 | in | L | 9 | in | N.P.C. |
| R | 9 | in | P | 13 | out | N.P.C. |

| PR index nr | segm nr | bp | B1 | vsgm | ep | B2 | index |
|---|---|---|---|---|---|---|---|
| 1 | A | 1 | out | — | 2 | in | |
| 2 | D | 2 | out | A | 4 | in | |
| 1-1 | E | 2 | in | A | 3 | out | |
| 3 | H | 4 | out | D | 6 | in | |
| 2-1 | F | 3 | out | E | 5 | in | |
| 4 | K | 6 | in | H | 7 | in | |
| 3-1 | L | 5 | out | F | 8 | in | |
| 5 | O | 7 | in | K | 9 | in | |
| 1-5 | R | 9 | in | O | 13 | out | P.S. |
| 1-4 | N | 7 | in | K | 11 | out | P.S. |
| 1-3 | J | 6 | in | H | 16 | out | P.S. |
| 4-1 | P | 8 | in | L | 9 | in | P.S. |
| 5-1 | R | 9 | in | P | 13 | out | P.S. |

TABLE 6D

Situation 7

| segm nr | bp | B1 | vsgm | ep | B2 | index |
|---|---|---|---|---|---|---|
| Z | 14 | out | Y | 15 | out | N.P.C. |

| PR index nr | segm nr | bp | B1 | vsgm | ep | B2 | index |
|---|---|---|---|---|---|---|---|
| 1 | A | 1 | out | — | 2 | in | |
| 2 | D | 2 | out | A | 4 | in | |
| 1-1 | E | 2 | in | A | 3 | out | |
| 3 | H | 4 | out | D | 6 | in | |
| 2-1 | F | 3 | out | E | 5 | in | |
| 4 | K | 6 | in | H | 7 | in | |
| 3-1 | L | 5 | out | F | 8 | in | |
| 5 | O | 7 | in | K | 9 | in | |
| 1-5 | R | 9 | in | O | 13 | out | |
| 1-4 | N | 7 | in | K | 11 | out | |
| 4-1 | P | 8 | in | L | 9 | in | |
| 5-1 | R | 9 | in | P | 13 | out | |
| 2-5 | Y | 13 | in | R | 14 | out | |
| 2-4 | X | 11 | in | N | 13 | in | |
| 3-4 | Y | 13 | in | X | 14 | out | |
| 6-1 | Y | 13 | in | R | 14 | out | |
| 4-4 | Z | 14 | out | Y | 15 | out | P.S. |
| 3-5 | Z | 14 | out | Y | 15 | out | P.S. |
| 7-1 | Z | 14 | out | Y | 15 | out | P.S. |

| | TKKN | |
|---|---|---|
| 1 | 1 | 1 |
| 2 | 2 | 1-1 |
| 3 | 3 | 2-1 |
| 4 | 4 | 3-1 |
| 5 | 1-4 | 4-1 |
| 1-5 | 2-4 | 5-1 |
| 2-5 | 3-4 | 6-1 |
| 3-5 | 4-4 | 7-1 |

The respective lists L3 and a possible representation of the content of the relevant associated data structure PSD are shown in Tables 6A, 6B, 6C and 6D. It should be noted that the data structure PSD is preferably a linked list structure, because of its dynamic character. For the sake of simplicity the contents are shown in the Tables as a list of segments. The fifth VLPA is present twice: first with direction north and then with direction east. The vehicle took a right turn there. In situation 1 (Table 6A), only segment A is a P.S. in list L3. This N.P.S. is entered as the first segment into the structure PSD with possibly driven routes PR. A representation of this structure as a list containing possibly driven routes PR is shown for each situation in Tables 6A, 6B, 6C and 6D. FIG. 12 shows a tree structure (for the sake of clarity, but purely theoretically), the tree structure containing the relevant PR segments for each situation. It should be noted that each segment has the attributes described in the foregoing. In situation 1 segment A has the status P.S., illustrated by the small circle around A in FIG. 12. In situation 2 there are three P.S. of which two are N.P.S., which are placed into the structure. Segments D and E are both contiguous to segment A and are given PR-index no. 2 and 1-1, respectively. These PR-index numbers render it possible to distinguish different branches in the structure. In an implementation this can be done by means of pointers in a linked list structure. In situation 2 segment A is adapted as P.S. (the boolean value which indicates whether the end point is located or not located in the VLPA, changes, for example, as does also angle $\Delta\phi$). Thus, the new possibly driven route segments are successively added in the data structure. Finally, (situation 7) there are three branches from A, which all three end in Z. It should be noted that for an implementation it may be advantageous to store, in a linked list structure, one next to the other, all the branches of the tree shown in FIG. 12; the flexibility this provides offsets the redundancy. If the data structure with PR segments becomes overcrowded (contains more than one predetermined threshold value) such a number of oldest route segments can be removed from the data structure that the new degree of occupancy is less (than a given further threshold value). Alternatively, the data structure being too full, a signal can be generated indicating that a relocalization is necessary.

After this storage of possibly driven routes PR in the data structure PSD, new requests to the global data base for data are generated in block 2.4 of FIG. 2, the so-called queries. To enable a fastest possible performance of the test steps, only data which are really necessary are requested from the global data base, i.e. data relating to segments in the vicinity of the current position of the vehicle. On the basis of list L3 it can be determined which queries are required: the indices of list L3 indicate which segments are N.P.S. or N.P.C. The most commonly used query-types are as follows:

given a chain, give all chains which are contiguous to both nodes, the given chain excepted;
given a chain and a node, give the chains of the other associated node, the given chain excepted;
given a node, give all chains contiguous to that node.

See FIG. 13. In block F1 it is checked whether L3 is empty. If no, then in block F2 the queries with the N.P.C. of L3 are performed. If yes, then it is checked in block F3 whether a relocalization has taken place. In that case a relocalization-query with the given relocalization-node is effected. Thereafter, in the blocks F5 and F6, when short chains are present, the additional queries then required are performed.

Or the successively calculated dead reckoning coordinates the recent past is always saved, from which so-called pseudo-segments are derived: a plurality of successively calculated dead reckoning coordinates located substantially on a straight line become a so-called straight pseudo-segment (7hich resembles a segment of the data base), and a plurality of sequentially calculated dead reckoning coordinates which are not located on a straight line become a so-called vague pseudo-segment (for example at a curve in the road). The pseudo-segments thus determined are stored in an additional data structure DRD. This is done as follows. See FIG. 14. In block 14.1 any old information present is removed in the further data structure DRD, for example a linked list structure, and a new starting point is stored. This is effected in the case of a reset (a correction in accordance with the invention performed on the dead reckoning coordinates), or at a relocalization (manually, because a user pushes a button intended therefor). The starting point is now at the same time the end point of the Dead Reckoning History, namely equal to the current position in accordance with the calculation of the dead reckoning coordinates. Further attributes, such as the length Ldr determined from the dead reckoning calculations, the length Lcs determined from the coordinates of the starting and end points, the average direction of travel (through a straight pseudo-segment) $\phi$dr determined from the dead reckoning calculations, the direction of travel $\phi$cs through a straight pseudo-segment determined from the coordinates of the starting and end points, and the number N of dead reckoning calculations in this pseudo-segment, are initialized: $\phi$cs=Lcs=Ldr=0, $\phi$dr=current direction of travel $\phi$v, N=0. In block 14.2 the Dead Reckoning History is built up from the new starting point. The measured current direction of travel $\phi$v is each time compared to the average direction of travel $\phi$dr. As long as these directions are in agreement (they differ for less than a given threshold value from each other), the car drives along a straight pseudo-segment, and on the basis of subsequent measurements the length of the current pseudo-segment is successively increased, until the directions are no more in agreement, whereafter the current pseudo-segment is ended and a new pseudo-segment begins. Finished pseudo-segments are stored in data structure DRD. So as to enable a comparison of the pseudo-segments to the possibly driven route segments P.S. in data structure PSD, the current P.S. are retrieved from PSD and also entered into DRD. When the vehicle changes its direction (changes from forward drive to reverse or vice versa) a new pseudo-segment is started. When the vehicle is in reverse, the direction of travel is corrected by 180° and the distance covered is corrected by taking the absolute value. When a pseudo-segment found is too short, it becomes a vague pseudo-segment. Contiguous vague pseudo-segments are linked to form one vague pseudo-segment. In block 14.3 the Dead Reckoning History is adapted by combining pseudo-segments having substantially the same directions and by replacing (where possible) vague pseudo-segments by fitting lengths of straight pseudo-segments. If, for example, straight pseudo-segment PS1 has starting point A and end point B, and straight pseudo-segment PS2 has starting point B and end point C, and the distance between point B and line section L with starting point A and end point C is less than a given threshold value, PS1 and PS2 can be combined to form one new straight pseudo-segment: the line section L. Said threshold value must be small, as otherwise the smallest detectable difference in direction in the Dead Reckoning History becomes too large. In the following cases it is possible to replace in DRD a vague pseudo-segment between two straight pseudo-segments.

Case 1: the vague length is the result of a small deviation of the straight line along which the vehicles moves, for example in order to avoid an obstacle. Let it be assumed that straight pseudo-segment PS1 has starting point A and end point B, vague pseudo-segment PS2 is located between the points B and C and has length V, straight pseudo-segment PS3 has starting point C and end point D. Line section L has starting point A and end point D. If now the distance from B to L and also the distance from C to L is less than a predetermined threshold value, and V is approximately equal to the distance from B to C, then PS1, PS2 and PS3 can be replaced by one new straight pseudo-segment: the line section L.

Case 2: the vague length is the result of a 90° bend in the dead reckoning route. Let it be assumed that the configuration is the same as in case 1. If now the point of intersection of the lines on which PS1 and PS3 are located is not too far from PS2, PS1 and PS3 can be extrapolated to contiguous straight pseudo-segments, and PS2 is cancelled.

Hereafter attributes Lcs and $\phi$cs are adapted to the new situation. Finally, in block 14.4, for the case in which the data structure DRD has a degree of occupancy exceeding a predetermined threshold value, so when the Dead Reckoning History gets too long, the oldest portion of DRD is removed, more specifically to such an extent, that the new degree of occupancy is below a further threshold value. This may be necessary when no reset or relocalization has been effected for a long period of time.

Now that the Dead Reckoning History (in data structure DRD) and the possibly driven route segments (in data structure PSD) are available, a well-founded decision can be taken about a correction of the dead reckoning coordinates. A correction vector or reset vector is derived from the combined data from the two data structures. When PSD includes a plurality of possibly driven routes or "branches" assembled from route segments, the best fitting branch must be selected therefrom. The reset vector is then determined on the basis of this best fitting "branch" and the Dead Reckoning History (which consists already of one "branch"). Eliminating branches which are not suitable is effected in two steps: first the lengths of a pseudo-segment and the associated route segments are compared, thereafter reset vectors are determined for each branch and, based on given criteria, branches are rejected. The determination of the correction vector can be effected each time the vehicle has covered a fixed, predetermined distance or, alternatively, when, for example, the two data structures PSD and DRD contain sufficient information (more than one given critical value). To determine the reset vector it may be necessary to copy the data structures PSD and DRD temporarily into a separate memory sector, to prevent the content of the data structures from being altered during the reset calculation. When a relocalization is effected while a reset is being calculated, the calculated reset must be ignored, as otherwise a superfluous and consequently faulty reset is effected after the relocalization. The first step in the elimination of the branches proceeds as follows: the lengths of a pseudo-segment and the associated route segments are compared. If the lengths differ for more than a given threshold value, the branch is rejected. Conditions for the use of this test are: the pseudo-segments preceding and following the relevant pseudo-segment are straight (not vague), have a length exceeding a given minimum value, and are substantially perpendicular to the relevant pseudo-segment; the route segments preceding and following the set of associated route segments have a length exceeding a given minimum value, and are substantially perpendicular to the associated route segments; the associated route segments have only one associated pseudo-segment and have a length exceeding a given minimum value.

The second step in the elimination of the branches proceeds as follows. The starting point is the pseudo-segment which ends in the current position of the vehicle. At this pseudo-segment, for each branch of possibly driven route segments there is calculated on the basis of the corresponding route segment a segment translation vector (denoted STV hereinafter), which points from the pseudo-segment to the relevant route segment. On the basis of the segment translation vectors determined so far (for example by means of the least squares method) a branch translation vector (denoted TTV hereinafter) is kept and updated for each branch; for this first pseudo-segment this branch translation vector is equal to the STV. When the TTV has been determined for all branches, it is checked whether a reset on the basis of one of these TTVs is justified (which is the case when the relevant STV's have a sufficient mutual correlation). If not, the preceding pseudo-segment in the Dead Reckoning History is considered, and a STV is determined again for each branch, whereafter the TTVs are renewed. A check is then made again to see whether a reset is possible, etcetera, until a reset is justified, or the Dead Reckoning History is exhausted. See FIG. 15, in which a portion of the Dead Reckoning History and the possibly driven route segments are schematically shown from an actual position PP. Four pseudo-segments PS1, PS2, PS3 and PS4 form the Dead Reckoning History. The associated possibly driven route segments, are S1 and S2 (at PS1), S3 and S4 (at PS2), S5 (at PS3) and S6 (at PS4). The route segments consequently form two "branches" here: S1-S3-S4-S5-S6 and S2-S4-S5-S6. In addition, segment translation vectors V1 to V6, inclusive, are shown. In the first step a STV pointing from PS1 to the respective associated route segments S1 and S2 is determined for the two branches. These two segment translation vectors, V1 and V2, are both what are denoted partial translation vectors, that is to say: they only furnish information about the component of the desired reset vector perpendicularly to the direction of the relevant route segments and pseudo-segments. When the length of a pseudo-segment is substantially equal to the length of an associated route segment (as in FIG. 15 at PS2 and S4) a what is called complete translation vector can be determined, which also gives information about the component of the desired reset vector parallel to the direction of the relevant segments. The vectors V1 and V2 found are negatively correlated, so that a reset after this first step is not possible yet. Thereafter, in step 2, a further STV, V3 and V4, respectively, is determined for the two branches. In FIG. 15 V3 is the partial segment translation vector for PS2 and S3 together with S4, and V4 is the complete segment translation vector for PS2 and S4.

A TTV is now determined for each branch. In this determination a weight is allocated to the relevant STV's, which weight is greater for a complete STV than for a partial one. At least two non-parallel partial segment translation vectors are required to calculate a complete segment translation vector. In the example of FIG. 15, V1 and V3 together form the TTV of branch S1-S3-S4, and V2 and V4 together form the TTV of branch S2-S4, V4 having a greater weight than V2. When there are more than two partial translation vectors, for example after the fourth step in FIG. 15, when V1, V3, V5 and V6 for one branch and V2, V4, V5 and V6 for the other branch have been determined, the TTV is determined using the least squares method, which is known per se and is described in "Course on radio-positioning" by G. Bakker, J. C. de Munck and G. L. Strang van Hees, Department of Geodesy, Delft University of Technology, 1985. As a result thereof the partial (and, if any, the complete, having a greater weight) segment translation vectors are combined into one optimum branch-translation vector.

Simultaneously, the covariance-matrix associated with the TTV is also calculated, from which an error ellipse is calculated. For all these calculations, which are known per se, reference is made to the document "Course on radio-positioning". If more STV's than the minimum number are used for the determination of a TTV, this redundancy can be used for a statistic test. See the document mentioned above. These additionally calculated quantities are used to remove branches which proved to be unsuitable. This proceeds as follows: in the event of redundancy in the least squares method calculation of a TTV, more than one reset-vector per branch can be determined. When these reset-vectors are insufficiently correlated (they have different lengths and directions), then the branch is unfit. This can be detected by means of a known correlation test. The branch is then rejected. When thus all branches but one have been rejected (or when the TTV's of all the remaining branches are substantially identical), it is checked for this branch whether the STV's from which the remaining TTV has been determined, are sufficiently correlated relative to each other, with the aid of the covariance-matrix. In that case a reset is performed having as the reset-vector the relevant TTV, which in accordance with the least squares method optimally suits the given segment-translation vectors of the branch. After each step a check is made whether a reset is possible. If not, then a step back is made again in the Dead Reckoning History. In FIG. 15, for example, after the fourth step in the Dead Reckoning History (PS4) the branch S1-S3-S4-S5-S6 is rejected because the reset-vector determined from V1 and V3 and the reset-vector determined &rom V5 and V6 are inconsistent. In contrast thereto, the TTV of branch S2-S4-S5-S6 is suitable for use as reset-vector, as V2, V4, V5 and V6 are sufficiently mutually correlated. The reset is then effected (the dead reckoning coordinates are corrected by the reset-vector into valid actual position coordinates), data structures PSD and DRD are emptied, and the structuring of the Dead Reckoning History and the possibly driven route segments can be started once again, until a subsequent reset will be carried out.

If during the stepwise traverse of the Dead Reckoning History for the determination of a reset-vector after the last psuedo-segment (so the oldest in the DRD) a reset is still not justified, the vector which perpendicularly projects the current position of the vehicle onto the nearest route segment, may be used as the reset-vector. Alternatively, the reset may be postponed until, for example, the next curve.

FIG. 16 shows an arrangement according to the invention. A (micro-) processor $\mu P$ receives navigation parameters from sensors S1, S2, ..., Sn, from which $\mu P$ calculates dead reckoning coordinates. Global data base GD contains topographical and traffic technical information, from which, under the control of $\mu P$ sub-information is applied to working memory LND, which includes a dynamic local navigation data base. By performing test steps, $\mu P$ selects from LND possibly driven route segments, and stores them in working memory PSD. Under the control of $\mu P$, the Dead Reckoning History is stored in working memory DRD. Working memories PSD and DRD repeatedly provide $\mu P$ with data for the repeated determination of a correction vectors, using correlation tests.

We claim:

1. A method of determining the route traveled by a vehicle comprising:
   measuring navigation parameters relating to the movement of the vehicle;
   utilizing the navigation parameters to calculate dead reckoning coordinates of the vehicle;
   comparing the calculated dead reckoning coordinates to stored global information representing at least one of topographical and traffic technical information for a general area;
   selecting from the stored global information local information representing at least one of topographical and traffic technical information for a specific area in which the calculated dead reckoning coordinates lie;
   storing the selected local information in a local navigation data base;
   selecting from the local information stored in the local navigation data base route segments which are consistent with vehicle positions represented by the calculated dead reckoning coordinates;
   storing the selected route segments in a first predefined data structure.

2. A method as in claim 1 where pseudo-segments are derived from consecutively calculated dead reckoning coordinates, said pseudo-segments forming a pseudo-route and being stored in a second predefined data structure.

3. A method as in claim 2 where the pseudo-segments are divided into straight pseudo-segments having a substantially constant direction, and vague pseudo-segments.

4. A method as in claim 3 vague pseudo-segments caused by a curve or a brief deviation from a straight road are removed from the second predefined data structure, the relevant straight pseudo-segments being replaced by extrapolated, contiguous straight pseudo-segments.

5. A method as in claim 3 or 4 where contiguous straight pseudo-segments having substantially the same direction are combined to form one new straight pseudo-segment.

6. A method as in claim 2, 3 or 4 where, when the second predefined data structure has a degree of occupancy exceeding a first threshold value, as many of the oldest pseudo-segments are removed from said data structure as are needed to reduce the degree of occupancy below a second threshold value.

7. A method as in claim 1 where, when the first predefined data structure has a degree of occupancy exceeding a third threshold value, as many of the oldest route segments are removed from said data structure as are needed to reduce the degree of occupancy to less than a fourth threshold value.

8. A method as in claim 2 where, by comparing the route segments in the first predefined data structure and the pseudo-segments in the second predefined data structure a correction vector for the dead reckoning coordinates is periodically determined.

9. A method as in claim 8, where, during said comparison, for each possibly driven route assembled from route segments a branch-translation vector from the pseudo-route is determined on the basis of at least two segment-translation vectors from pseudo-segments making up the pseudo-route, to associated route segments, wherein by means of correlations tests performed on the composite segment-translation vectors a best fitting branch-translation vector is selected as the correction vector.

10. A method as in claim 9, where, if the segment-translation vectors making up the best fitting branch-translation vector are correlated less than a first critical value, the vector which perpendicularly projects the current dead reckoning coordinates onto the nearest route segment is used as the correction vector.

11. A method as in claim 8, 9 or 10 where the correction vector is determined each time the vehicle has covered a given distance.

12. A method as in claim 8, 9 or 10 where the correction vector is determined each time the first predefined data structure and the second predefined data structure both contain a number of segments exceeding a second critical value.

13. A method as in claims 8, 9 or 10 where, after each correction vector determination, the first predetermined data structure and the second predefined data structure are emptied.

14. A method as in claim 8, 9 or 10 where, using the correction vector, the dead reckoning coordinates are corrected to form valid actual position coordinates.

15. An arrangement for determining the route traveled by a vehicle comprising:
    means for providing navigation parameters relating to the movement of the vehicle;
    a memory for storing a global data base containing at least one of topographical and traffic technical information for a general area;
    a processor for utilizing the navigation parameters to calculate dead reckoning coordinates of the vehicle and for comparing said coordinates to information in the stored global data base;
    a memory for storing a dynamic local navigation data base containing information selected from the global data base for a specific area in which the calculated dead reckoning coordinates lie;
    a first working memory for storing, in a first predefined data structure, route segments which are consistent with vehicle positions represented by the calculated dead reckoning coordinates;
    a second working memory for storing, in a second predefined data structure, pseudo segments which are derived &rom consecutively calculated dead reckoning coordinates and represent a pseudo route;
    said processor also being adapted to compare the contents of the first and second working memories to determine a correction vector for the dead reckoning coordinates.

16. An arrangement as claimed in claim 15 where the processor, when comparing the contents of the second and third working memories for the determination of the correction vector, determines for every possibly driven route from PSD a branch translation vector from the pseudo-route on the basis of at least two segment-translation vectors from pseudo-segments making up the pseudo-route, to associated route segments, the processor being programmed to select by means of correlation tests performed on the composite segment-translation vectors a best fitting branch-translation vector as the correction vector.

* * * * *